United States Patent [19]

Buchanan, Jr.

[11] Patent Number: 4,765,018
[45] Date of Patent: Aug. 23, 1988

[54] WIPER ASSEMBLY WITH AUTOMATICALLY EXTENDING WIPE PATTERN

[75] Inventor: Harry C. Buchanan, Jr., Spring Valley, Ohio

[73] Assignee: General Motors Corporation, Detroit, Mich.

[21] Appl. No.: 74,098

[22] Filed: Jul. 16, 1987

[51] Int. Cl.⁴ ................................................ B60S 1/04
[52] U.S. Cl. ............................. 15/250.13; 15/250.14; 15/250.15; 15/250.3
[58] Field of Search ........... 15/250.13, 250.14, 250.15, 15/250.27, 250.21, 250.3, 250.34

[56] References Cited

U.S. PATENT DOCUMENTS

| | | | |
|---|---|---|---|
| 3,003,172 | 10/1961 | Harris | 15/250.27 X |
| 3,016,753 | 1/1962 | Ziegler | 15/250.15 X |
| 4,347,640 | 9/1982 | Durtnal | 15/250.32 |
| 4,369,542 | 1/1983 | Tamura | 15/250 B |
| 4,431,954 | 2/1984 | Carpenter | 15/250.13 X |

FOREIGN PATENT DOCUMENTS

| | | | |
|---|---|---|---|
| 873409 | 3/1942 | France | 15/250.13 |
| 0241237 | 10/1986 | Japan | 15/250.13 |
| 1429807 | 5/1976 | United Kingdom | 15/250.3 |

Primary Examiner—Harvey C. Hornsby
Assistant Examiner—K. L. O'Leary
Attorney, Agent, or Firm—Patrick M. Griffin

[57] ABSTRACT

A passenger side wiper includes a means that allows its normal wipe pattern to automatically extend under extreme conditions of high windshield wetting, and high wiper speed. A preloading spring mechanism allows the wiper arm to slip under the inertial effects of those extreme conditions, to extend the wipe pattern limit.

3 Claims, 1 Drawing Sheet

WIPER ASSEMBLY WITH AUTOMATICALLY EXTENDING WIPE PATTERN

This invention relates to vehicle windshield wiper assemblies in general, and specifically to a wiper assembly in which the wipe pattern of a wiper arm automatically extends when the wetting of the windshield increases.

BACKGROUND OF THE INVENTION

Vehicle windshield wiper assemblies typically have a pair of wiper arms, which are swept outwardly and back inwardly in tandem between inner and outer limits that define what may be termed as a normal wipe pattern. Federal standards set guidelines for what the normal wipe pattern must be. The wiper arms are swept back and forth by a power source, generally an electric drive motor, that has a low and a high setting, or perhaps a continuously variable range of high and low settings. Usually, the driver's side wiper arm will be driven by the motor, while the passenger side wiper arm will be driven in tandem through a link mechanism. In general, the higher power settings will sweep the wiper arms back and forth at a higher speed. Consequently, the higher power settings will be chosen for heavier rains, that is, when the wetting of the windshield surface is greater, there being no reason to choose the higher power settings when the wetting is slight. The setting of the drive motor is not the only factor that determines the resultant angular speed of the wiper arms, however. The surface of the windshield presents more or less frictional resistance to the blade of the wiping arm, depending on whether it is tacky or well wetted. Therefore, a given power setting will generally produce higher resultant wiper arm speeds as the surface becomes wetter. The resistance of the windshield surface to having the blade wiped across it creates a consequent opposing reaction torque in the wiper arm, which, for any power setting, is generally greater for drier, more frictional windshield surface conditions. However, research involved in the development of the subject invention showed that the inertial tendency of the wiper arm to keep moving in the direction that it is sweeping becomes a very significant component of reaction torque as the limits of the wipe pattern are approached. The inertial effects can cause the peak reaction torque to reach a maximum for the extreme conditions of highest power setting and greatest windshield wetting, a maximum that can be significantly greater than the peak reaction torque for other conditions.

SUMMARY OF THE INVENTION

The invention takes advantage of the fact above noted to provide an improved wiper assembly of the type described above that has a means for automatically extending the wipe pattern of at least one of the wiper arms when the wetting of the windshield is greatest and the power setting is consequently higher.

Rather than driving the passenger side wiper arm directly with the link, it is driven indirectly with a drive assembly intermediate the link and the wiper arm. In the embodiment disclosed, the drive assembly includes a drive plate pivoted to the vehicle so as to be driven by the link over the same angle as the normal wipe pattern. A drive arm is joined to the same pivot so that it can swing in scissors fashion relative to the drive plate. The wiper arm is rigidly attached to, and turns one to one with, the drive arm. A compression spring biased between the drive plate and the drive arm provides a preloading torque and normally holds the drive arm against a stop tab on the drive plate, continuously forcing it and the wiper arm to swing in the inward sweep direction. The strength and location of the spring is chosen so that the magnitude of the preloading torque is less than the magnitude of the maximum wiper arm peak reaction torque, which occurs at the conditions of high power settings and greatest windshield wetting and as the limits of the normal wipe pattern are approached. The preloading torque is chosen to be greater in magnitude than the wiper arm peak reaction torque at other conditions, however. Consequently, during heavy rains, when the power setting is high, as the outwardly sweeping passenger side wiper arm approaches the outer limit of its normal wipe pattern, the maximum peak reaction torque will overcome the preloading torque and compress the spring. This allows the passenger side wiper arm to overshoot its outer limit. This extension of the wipe pattern occurs automatically, under those conditions where it is desirable. Under other conditions, the wiper arm reaction torque does not cancel out and overcome the preloading torque, so the spring does not compress, and the normal wipe pattern is followed.

It is, therefore, an object of the invention to improve a conventional wiper assembly by providing a means that will automatically extend the wipe pattern of one of the wiper arms only when the wetting of the windshield is increased and the power setting is high, and follow the normal wipe pattern otherwise.

It is another object of the invention to provide such an improved wiper assembly in which one of the wiper arms is driven through an indirect drive assembly that applies a preload torque to the wiper arm the magnitude of which is less than the maximum peak reaction torque experienced by the wiper arm under the extreme conditions of high power setting and greater windshield wetting, but greater than the peak reaction torque under other conditions, so that the wiper arm will wipe past its normal outer limit under the extreme conditions, but not otherwise.

It is yet another object of the invention to provide such an indirect drive assembly that includes a drive arm that is rigidly attached to the wiper arm, but which is pivoted relative to a drive plate that is driven about the pivot through an angle equal to the normal wipe pattern, with a spring that biases the drive arm against a stop member on the drive plate with a preload torque chosen to allow the spring to compress under extreme conditions, which in turn allows the wiper arm to wipe beyond its normal outer limit, while the spring keeps the drive arm against the stop member under other conditions, so that the normal wipe pattern is followed.

DESCRIPTION OF THE PREFERRED EMBODIMENT

These and other objects and features will appear from the following written description, and from the drawings, in which.

Figure 2:
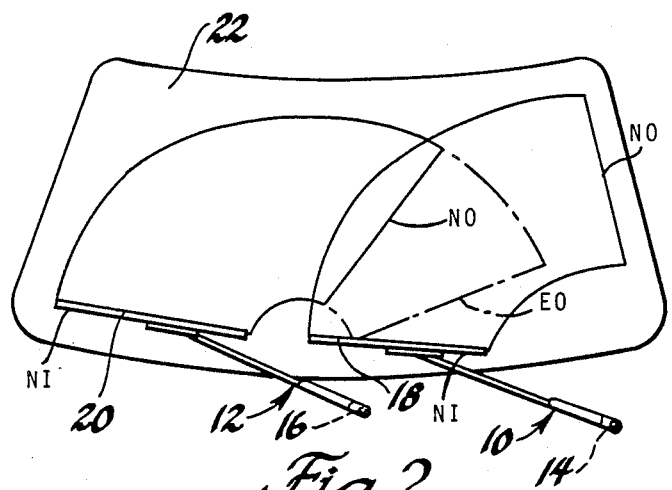
FIG. 2 is a diagrammatic view showing the normal and extended wipe patterns of the wiper assembly of the invention, relative to a vehicle windshield surface.
Figure 3:
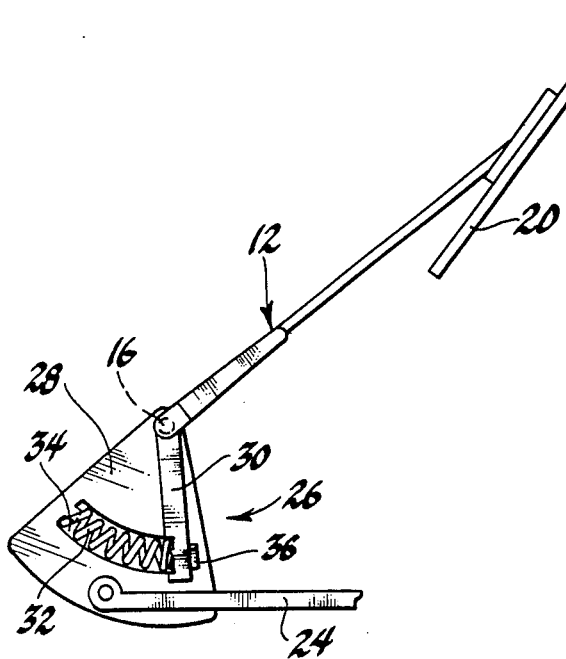
FIG. 3 is a view of the passenger side wiper arm separate from the vehicle.

Referring first to FIGS. 2 and 3, as much of the wiper assembly of the invention as is conventional will be first described. A conventional vehicle windshield wiper assembly includes driver and passenger side wiper arms designated generally at 10 and 12, which are swept outwardly and back inwardly about vehicle mounted pivot pins 14 and 16 over a normal arcuate wipe pattern, defined between inner and outer limits designated NI and NO. From the perspective of FIG. 2, which is outside the vehicle, the wiper arms 10 and 12 move clockwise as they are swept outwardly, and counterclockwise as they are swept back inwardly. As the wiper arms 10 and 12 are so moved, side mounted wiper blades thereof, designated at 18 and 20 respectively, are wiped across a windshield surface 22. As is best seen in FIG. 2, the normal outer limit of the driver side wiper arm 10 is near the side edge of the windshield surface 22, and it cannot go much farther. The normal outer limit of the passenger side wiper arm 12, however, is at the one or two o'clock position, and is not near the bottom edge of the windshield surface 22. The wiper arms 10 and 12 are swept back and forth by a suitable power source, such as a variable electric motor, not illustrated, that has selectable lower and higher settings. The passenger side wiper arm 12, which is the wiper that incorporates the invention, is moved in tandem with driver side wiper arm 10 by a suitable link, such as link 24. Although not required by current regulations, it would be desirable under the extreme conditions of greater wetting of the windshield surface 22 and high power settings, to extend the wipe pattern outer limit of the passenger side wiper arm 12 beyond NO, to the position EO. This would, in effect give double wiping to that extra arcuate area shown in dotted lines in FIG. 2. It would not be desirable, however, to provide such double wiping under other conditions. The invention meets these goals, as will be described below.

Figure 1:
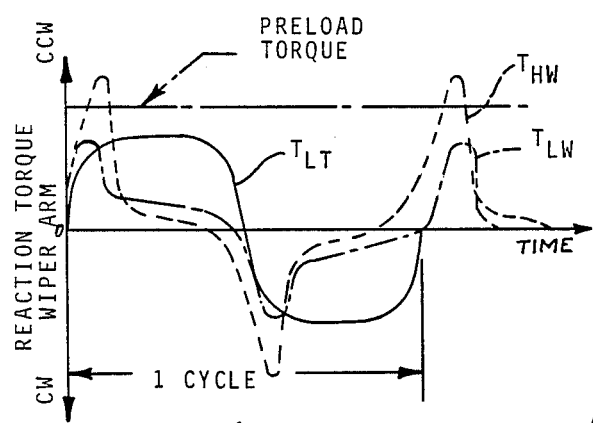
FIG. 1 is a graph showing the reaction torques experienced by a wiper arm under various conditions for one complete wipe cycle and the start of the next cycle.

Referring next to the graph of FIG. 1, moving the wiper arms 10 and 12 in one direction creates a reaction torque in the opposing direction, measured about the pivots 14 and 16, that has a general sinusoidal shape when graphed versus time. When the windshield is drier, or tacky as it is generally called, and the power setting is low, the main factor in creating reaction torque is mainly the frictional resistance of the windshield surface 22 on the blades 16 and 18. The reaction torque for this condition is designated as Tlt. The counterclockwise direction of torque is designated as positive. So, over the first half of the cycle for Tlt, when the wiper arms 10 and 12 are sweeping outwardly or clockwise from NI to NO, the opposing reaction torque is counterclockwise and positive. Over the second half of the cycle, when the wiper arms 10 and 12 are sweeping back inwardly or counterclockwise from NO back to NI, the opposing reaction torque is clockwise, or negative. A drier, stickier windshield surface would be expected to create a larger opposing reaction torque than would a wetter, less frictional surface. FIG. 1 shows that the reaction torque for a wetter surface and a low power designated Tlw, is in fact generally of lesser magnitude than Tlt. However, as noted above, research done in developing the subject invention showed that another component of the reaction torque seen by the wiper arms 10 and 12, the inertial effect, was more significant than had been generally realized. Even at low power settings, the increased wiper arm speed resulting from the wetter surface and the consequent inertial effect causes Tlw to turn negative as NO is approached and before it is reached. That is, the net reaction torque tends to rotate the wiper arm 12 clockwise, despite the fact that the frictional opposing force alone would be counterclockwise. As seen, Tlw turns negative sooner than does Tlt, diving below the neutral axis before NO is reached. In fact, the inertial factor causes the reaction torque Tlw to actually peak at a magnitude that approaches Tlt near the angular limits, even though the windshield surface 22 is wetter and less frictional. The inertial factor becomes even more significant at higher power settings with a wet windshield, and the magnitude of the reaction torque under those extreme conditions, designated Thw, is at a maximum when it peaks, significantly above Tlw or Tlt.

Referring next to FIGS. 2 and 3, the invention provides a means, the preferred embodiment of which is designated generally at 26, which extends the wipe pattern outer limit beyond the normal wipe pattern, and does so with an entirely mechanical, automatically acting structure. Rather than driving the passenger side wiper arm 12 directly with the link 24, it is driven with an indirect drive assembly that includes a drive plate designated generally at 28, a drive arm 30, and a compression spring 32. Drive plate 28 is stamped of steel or other suitable material in the general shape of an annular segment, with an interior arcuate slot 34 and a stop tab 36 at its right edge. Drive plate 28 is journaled to the passenger side wiper arm pivot pin 16, and is driven back and forth by link 24 over an angle equal to the normal wipe pattern. Drive arm 30 is non-turnably attached to the passenger side wiper arm 12, and the two together are journaled to pivot pin 16 and can, therefore, swing in scissors like fashion relative to the drive plate 28. However, spring 32, which is located in slot 34, continually presses on drive arm 30 and pushes drive arm 30 into stop tab 36, creating a positive torque about pivot pin 16. That is, the torque created by spring 32 tends to swing drive arm 30 and wiper arm 12 relative to drive plate 30 in the counterclockwise, inward sweep direction. So long as spring 32 remains uncompressed, it will prevent drive arm 30 from moving relative to drive plate 28. The strength of spring 32, and the length of drive arm 30, are deliberately chosen so that the magnitude of the torque provided, which may be conveniently referred to as the preloading torque, is less than the magnitude of the maximum peak reaction torque of Thw, but greater than Tlw or Tlt. This is shown in FIG. 1. What the actual values will be, of course, will depend on the particular characteristics of each wiper system. However, if chosen to have the general relation described, the preloading torque provides the desired result noted above, as will be next described.

Figure 4:
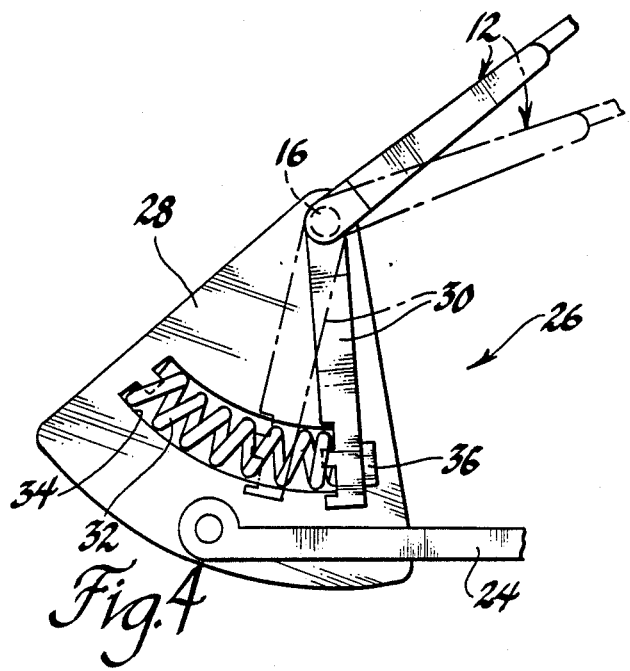
FIG. 4 is an enlargement of part of FIG. 3, showing the relative position of the parts thereof at the normal wipe pattern outer limit in solid lines, and the extended wipe pattern outer limit in dotted lines.

Referring next to FIGS. 2 and 4, under those conditions when the reaction torque seen by wiper arm 12 is Tlt or Tlw, the positive preloading torque will always be greater in magnitude. Therefore, the sum of the reaction torque and the preloading torque, which is the net torque acting on the wiper arm 12, will always be positive, always tending to rotate the drive arm 30 counterclockwise, and always forcing the drive arm 30 into the stop tab 36. Consequently, spring 32 will not compress, and the wiper arm 12 will always turn one to one with the drive plate 28. The normal wipe pattern between NI and NO will then be swept out by wiper arm 12. Under more extreme conditions, such as heavy rains, when the reaction torque seen by wiper arm 12 is Thw, the net torque seen by the wiper arm 12 becomes negative as wiper arm 12 approaches the outer limit NO, that is, as the magnitude of the maximum peak reaction torque Thw, which is negative, begins to exceed the magnitude of the positive preloading torque. The inertial tendency of the wiper arm 12 to keep sweeping outwardly, that is, clockwise, overcomes the preloading torque, and spring 32 compresses, allowing the drive arm 30 to swing clockwise relative to the drive plate 28. This, in turn, allows the passenger side wiper arm 12 to overshoot and sweep past its normal outer limit NO to EO. Spring 32 re-expands and returns wiper arm 12 to the one to one relation when the magnitude of Thw again falls to equal the magnitude of the preloading torque, giving a net zero torque as seen by the wiper arm 12. Therefore, the double wiping of the area outlined in FIG. 2 occurs automatically and exactly when wanted, under extreme conditions, but not otherwise. In addition, the spring 32 acts as a snow clutch, at least for wiper arm 12.

While shown in conjunction with a double wiper arm assembly, the invention could be used with a single wiper arm. The invention could be used with both arms of a double assembly, although it should not be logical as disclosed here, since the driver side wiper arm normal outer limit really cannot be practically extended. Indirect drive assemblies other than the exact embodiment 26 disclosed here could also be used, so long as they provided a preloading torque of similar magnitude that acted on the wiper arm 12 in the same direction. Therefore, it will be understood that the invention is not intended to be limited to the exact embodiment disclosed here.

The embodiments of the invention in which an exclusive property or privilege is claimed are defined as follows:

1. In a vehicle windshield wiper assembly in which a wiper arm is swept outwardly and back inwardly over a normal arcuate wipe pattern defined between inner and outer limits by a power source that has selected lower and higher settings, thereby creating a reaction torque in said wiper arm that peaks as the wiper arm approaches said inner and outer limits, and in which the power source is set higher when the wetting of the windshield surface increases, thereby creating a resultant angular speed of said wiper arm that is higher and a consequent maximum peak reaction torque that is greater than at other conditions of lesser windshield surface wetting and lower power settings, the improvement providing a means for automatically extending the wipe pattern of said wiper arm when the wetting of said windshield is increased, said means comprising, an indirect drive assembly intermediate said power source and said one wiper arm including a preloaded drive member that is adapted to slip only in the direction of said wiper arm outward sweep, and which continually applies a preloading torque to said wiper arm in the direction of its inward sweep that is less in magnitude than said maximum peak wiper arm reaction torque at increased windshield surface wetting and high power setting, but greater in magnitude than the peak wiper arm reaction torque at said other conditions, whereby, when the wetting of said windshield is increased and said power source is set higher, said maximum peak wiper arm reaction torque will overcome the preloading torque as the normal outer limit is approached and allow said preloaded drive member to slip so that said wiper arm can sweep past its normal outer limit, while, under other conditions, said wiper arm will turn one to one with said intermediate drive assembly, thereby sweeping through said normal wipe pattern.

2. In a vehicle windshield wiper assembly in which a wiper arm is swept outwardly and back inwardly over a normal arcuate wipe pattern defined between inner and outer limits by a power source that has selected lower and higher settings, thereby creating a reaction torque in said wiper arm that peaks as the wiper arm reverses direction at said inner and outer limits, and in which the power source is set higher when the wetting of the windshield surface increases, thereby creating a resultant angular speed of said wiper arm that is higher and a consequent maximum peak reaction torque that is greater than at other conditions of lesser windshield surface wetting and lower power settings, the improvement providing a means for automatically extending the wipe pattern of said wiper arm when the wetting of said windshield is increased, said means comprising, an intermediate drive plate joined to the pivot of said wiper arm so as to be driven back and forth over an angle equal to said normal wipe pattern, a drive arm joined to said passenger arm pivot so as to swing about said pivot relative to said reaction plate, said drive arm being non turnably attached to said wiper arm, a spring biased between said drive plate and said drive arm so as to continually apply a preloading torque to said drive arm to swing it and said wiper arm in the inward sweep direction, with the strength of said spring and the length of said drive arm being chosen so that the magnitude of said preloading torque is less than the magnitude of said maximum wiper arm peak reaction torque at increased windshield surface wetting and high power setting, but greater in magnitude than the wiper arm reaction torque at said other conditions, and a stop member on said drive plate engagable by said drive arm under the force of said spring, whereby, when the wetting of said windshield is increased and said power source is set higher, the maximum wiper arm peak reaction torque will overcome said preloading torque as the normal outer limit is approached and compress said spring, thereby allowing said drive arm to swing relative to said drive plate and allowing said wiper arm to sweep past its normal outer limit, while, under other conditions, said spring maintains said drive arm against said stop member so that said wiper arm turns one to one with said drive plate and sweeps through said normal wipe pattern.

3. In a vehicle windshield wiper assembly in driver and passenger side wiper arms are swept outwardly and back inwardly over a normal arcuate wipe pattern defined between inner and outer limits by a power source that has selected lower and higher settings, thereby creating a reaction torque in said wiper arms that peaks as the wiper arm approaches said inner and outer limits, and in which the power source is set higher when the wetting of the windshield surface increases, thereby creating a resultant angular speed of said wiper arms that is higher and a consequent maximum peak reaction torque that is greater than at other conditions of lesser windshield surface wetting and lower power settings, the improvement providing a means for extending the wipe pattern of said passenger side wiper arm when the wetting of said windshield is increased, said means comprising, an intermediate drive plate joined to the pivot of said passenger side wiper arm so as to be driven back and forth over an angle equal to said normal wipe pattern, a drive arm joined to said passenger arm pivot so as to swing about said pivot relative to said reaction plate, said drive arm being non turnably attached to said passenger side wiper arm, a spring biased between said drive plate and said drive arm so as to continually apply a preloading torque to said drive arm to swing it and said passenger side wiper arm in the inward sweep direction, with the strength of said spring and the length of said drive arm being chosen so that the magnitude of said preloading torque is less than the magnitude of said maximum passenger side wiper arm peak reaction torque at increased windshield surface wetting and high power setting, but greater in magnitude than the passenger side wiper arm reaction torque at said other conditions, and a stop member on said drive plate engagable by said drive arm under the force of said spring, whereby, when the wetting of said windshield is increased and said power source is set higher, the maximum passenger side wiper arm peak reaction torque will overcome said preloading torque as the normal outer limit is approached and compress said spring, thereby allowing said drive arm to swing relative to said drive plate and allowing said passenger side wiper arm to sweep past its normal outer limit, while, under other conditions, said spring maintains said drive arm against said stop member so that said passenger side wiper arm turns one to one with said drive plate and sweeps through said normal wipe pattern.

* * * * *